United States Patent [19]
Kikuchi et al.

[11] Patent Number: 5,921,729
[45] Date of Patent: Jul. 13, 1999

[54] DOUBLE-SURFACE MACHINING SYSTEM

[75] Inventors: Mitsuru Kikuchi, Mito; Koya Watanabe, Numazu; Yutaka Noda, Fuji; Masanao Shibui, Yamato, all of Japan

[73] Assignees: Kabushiki Kaisha Toshiba, Kawasaki; Japan Atomic Energy Research Institute, Tokyo, both of Japan

[21] Appl. No.: 08/880,160

[22] Filed: Jun. 24, 1997

[30] Foreign Application Priority Data

Jun. 25, 1996 [JP] Japan ................................. 8-164563

[51] Int. Cl.$^6$ ........................................................ B23C 9/00
[52] U.S. Cl. ........................... 409/138; 409/140; 409/157; 409/203
[58] Field of Search ............................ 409/138, 139, 409/140, 157, 159, 203; 408/42, 43, 44, 53; 82/54, 56, 129

[56] References Cited

U.S. PATENT DOCUMENTS

| | | | |
|---|---|---|---|
| 1,011,265 | 12/1911 | Summey | 409/157 |
| 3,250,179 | 5/1966 | Cavagnero | 409/157 |
| 3,686,917 | 8/1972 | Hikida et al. | |
| 3,762,273 | 10/1973 | Sprung | 409/138 |
| 3,791,258 | 2/1974 | Krall et al. | 409/139 |
| 3,823,627 | 7/1974 | Scharfen | 82/2 A |
| 3,839,942 | 10/1974 | Ferchland | 409/132 |
| 3,919,752 | 11/1975 | Ferchland | 29/103 R |
| 3,954,044 | 5/1976 | Ridgway | 409/139 |
| 4,047,470 | 9/1977 | Lorenz et al. | 409/157 |
| 4,077,448 | 3/1978 | Hasenwinkle et al. | 409/138 |
| 4,197,043 | 4/1980 | Houghton | 409/138 |
| 4,691,684 | 9/1987 | Negron-Crispo | 408/44 |
| 4,799,836 | 1/1989 | Kurisu et al. | 409/138 |
| 4,985,982 | 1/1991 | Lohr et al. | 409/138 |
| 5,651,722 | 7/1997 | Werner | 409/140 |

FOREIGN PATENT DOCUMENTS

44 07 613  3/1995  Germany .

*Primary Examiner*—Andrea L. Pitts
*Assistant Examiner*—Christopher Kirkman
*Attorney, Agent, or Firm*—Oblon, Spivak, McClelland, Maier & Neustadt, P.C.

[57] ABSTRACT

A double surface machining system for machining both side surfaces of a workpiece comprises, in an operational state, a pair of upper and lower spindle heads to be vertically positioned and driven, respectively, a pair of upper and lower spindles provided for the upper and lower spindle heads, respectively, in parallel to each other, to be rotatable about horizontal axes thereof, the upper and lower spindles having front ends to which tools are mounted, respectively, a pair of upper and lower workpiece supports for supporting the workpiece therebetween, which are vertically positioned and driven on one side of the upper and lower spindle heads as viewed from a workpiece feed direction, respectively, and another pair of upper and lower workpiece supports for supporting the workpiece therebetween, which are vertically positioned and driven on another one side of the upper and lower spindle heads as viewed from a workpiece feed direction, respectively. According to this structure, both the side surfaces of the workpiece are subjected to machining working simultaneously by the tools mounted to the respective spindles with being supported by the paired workpiece supports on both the sides of the spindle heads.

6 Claims, 7 Drawing Sheets

DOUBLE-SURFACE MACHINING SYSTEM

BACKGROUND OF THE INVENTION

1. Field of the Invention

The present invention relates to a double-surface (both-side) machining system particularly for grooving front and back surfaces (both sides) of a plate having no sufficient self-standing stiffness.

2. Description of the Related Art

In a known art, front and back surfaces of a plate having a large size (large-dimensional plate) such as a component of a large system such as a power-station equipment or particle accelerator have been grooved by mounting a plate as a workpiece on a surface plate and end-milling the plate one at a time side with an end mill (ball end mill) such as a large gantry mill; carrying the workpiece with a large angle rest and end-milling the workpiece one side bat a time with a large horizontal boring machine and an end mill; or mounting the workpiece on a rotary table and side-cutter-machining the workpiece one side at a time with a large horizontal boring machine and a side cutter.

In any one of the known cases mentioned above, the workpiece is grooved only one side at a time and that is, the front and back surfaces are to be separately grooved. Therefore, a lot of working time including arrangement working has been required. Particularly, in the case of end milling, a lot of working time has been required and a cutting efficiency has been low.

Moreover, although the side-cutter-machining provides an improved cutting efficiency compared with end milling machining, there is a possibility for the workpiece of drooping and deforming due to its own weight, and thereby, its flatness is deteriorated, which may result in a case that when the one-side machining is performed, the grooving may not be performed unless the large plate-like workpiece has a sufficient self-standing stiffness.

SUMMARY OF THE INVENTION

An object of the present invention is to substantially eliminate defects or drawbacks encountered in the prior art mentioned above and to provide a double-surface machining system capable of grooving, simultaneously and efficiently with high accuracy and high speed, both the surfaces of a workpiece such as a plate having a large size and no sufficient self-standing stiffness.

This and other objects can be achieved according to the present invention by providing a double-surface machining system for machining both side surfaces of a workpiece comprising, in an operational state:

a pair of upper and lower spindle heads to be vertically positioned and driven, respectively;

a pair of upper and lower spindles provided for the upper and lower spindle heads, respectively, in parallel to each other, to be rotatable about horizontal axes thereof, the upper and lower spindles having front ends to which tools are mounted, respectively;

a pair of upper and lower workpiece supports for supporting the workpiece therebetween, which are vertically positioned and driven on one side of the upper and lower spindle heads as viewed from a workpiece feed direction, respectively; and another pair of upper and lower workpiece supports for supporting the workpiece therebetween, which are vertically positioned and driven on another one side of the upper and lower spindle heads as viewed from the workpiece feed direction, respectively, wherein both side surfaces of the workpiece are subjected to machining working simultaneously by the tools mounted to the respective spindles with being supported by the two paired workpiece supports on both the sides of the spindle heads.

In a preferred embodiment, the machining system further comprises a slider disposed to be movable in a horizontal direction, a column means vertically mounted on the slider to hold the workpiece in a predetermined level and a worktable device including a slide table to be slidable in a horizontal direction normal to a moving direction of the column means and a rotary table rotatable about a vertical axis thereof, and the upper and lower spindle heads and the upper and lower workpiece supports are operatively mounted to the column means to be horizontally movable on the slider.

The column means may comprise two columns vertically disposed side by side on the slider, the upper and lower spindle heads are arranged between the two columns and supported thereby to be vertically movable, the one pair of upper and lower workpiece supports are supported by one of the two columns to be vertically movable and the another one pair of upper and lower workpiece supports are supported by another one of the columns to be vertically movable.

The one and another pairs of upper and lower workpiece supports are provided with one and another pair of upper and lower pinch rollers to be rotatable, respectively, for supporting the workpiece therebetween. The pinch rollers are rotatable about axes parallel to central rotational axes of the upper and lower spindle heads or about axes having certain angles in a horizontal plane.

Either one of upper and lower pinch rollers may be supported in a floatable manner so as to be elastically support the workpiece.

The one and another pair of upper and lower workpiece supports are independently positioned and driven in vertical directions thereof with respect to the upper and lower spindle heads by a feed mechanism comprising a screw means and a servomotor for driving the screw means.

According to the double-surface machining system of the structure described above, the right (one side) and left (another one side) upper and lower workpiece supports hold the workpiece at the right and left sides of the upper and lower spindles, whereby the flatness of the workpiece can be kept at the machining section even if the workpiece has no sufficient self-standing stiffness. Under the above state, tools such as side cutters are mounted respectively to the upper and lower spindles for simultaneously performing grooving working, for example, to both the side surfaces, i.e. front and back surfaces, of the workpiece located between tools mounted to the upper and lower spindles.

The type of the above simultaneous double-surface machining is not limited to the grooving, and it is determined according to the type of the tool mounted to the spindles and includes facing by means of a milling cutter and drilling by means of an angle head. Further, the grooving will be performed by an end milling in addition to a side-cutter machining.

Moreover, by mounting a tool only to either one of the upper and lower spindles and setting a workpiece supporting roller to the other one thereof instead of a tool, it is possible to perform a machining operation to only one of the upper and lower sides of the workpiece.

In the preferred embodiment, the double-surface machining system performs the grooving for forming grooves each having a free-form curve such as a circle, ellipse or D-shape by the compound movement of lateral movement (X-axis movement) of the column, horizontal movement (Y-axis movement) of the slide table and rotational movement of the rotary table.

Moreover, the columns are set on the slider in a pair in parallel, the upper and lower spindle heads are arranged between the two columns and vertically movably supported thereby, the right upper and lower workpiece supports are vertically movably supported by one of these two columns, and the left upper and lower workpiece supports are also vertically movably supported by the other one of the columns. According to this arrangement, the sufficient support strength can be obtained because the upper and lower spindle heads are supported between the two columns to be vertically movable.

Furthermore, the workpiece may be supported by the pinch rollers each of which rotates about the central axis thereof for the feed movement of the workpiece.

Since both or either one of the upper and lower pinch rollers are elastically supported in a floating manner, the workpiece is held by the upper and lower pinch rollers while the workpiece is elastically pinched.

Still furthermore, since the upper and lower workpiece supports are supported to be independently driven with respect to the upper and lower spindle heads, the upper and lower workpiece supports keep their flatness and support the workpiece independently regardless of the plate thickness of the workpiece and the cutting value such as the grooving depth thereof.

The nature and further characteristic features of the present invention will be made more clear from the following descriptions made with reference to the accompanying drawings.

DESCRIPTION OF THE PREFERRED EMBODIMENTS

Figure 1:
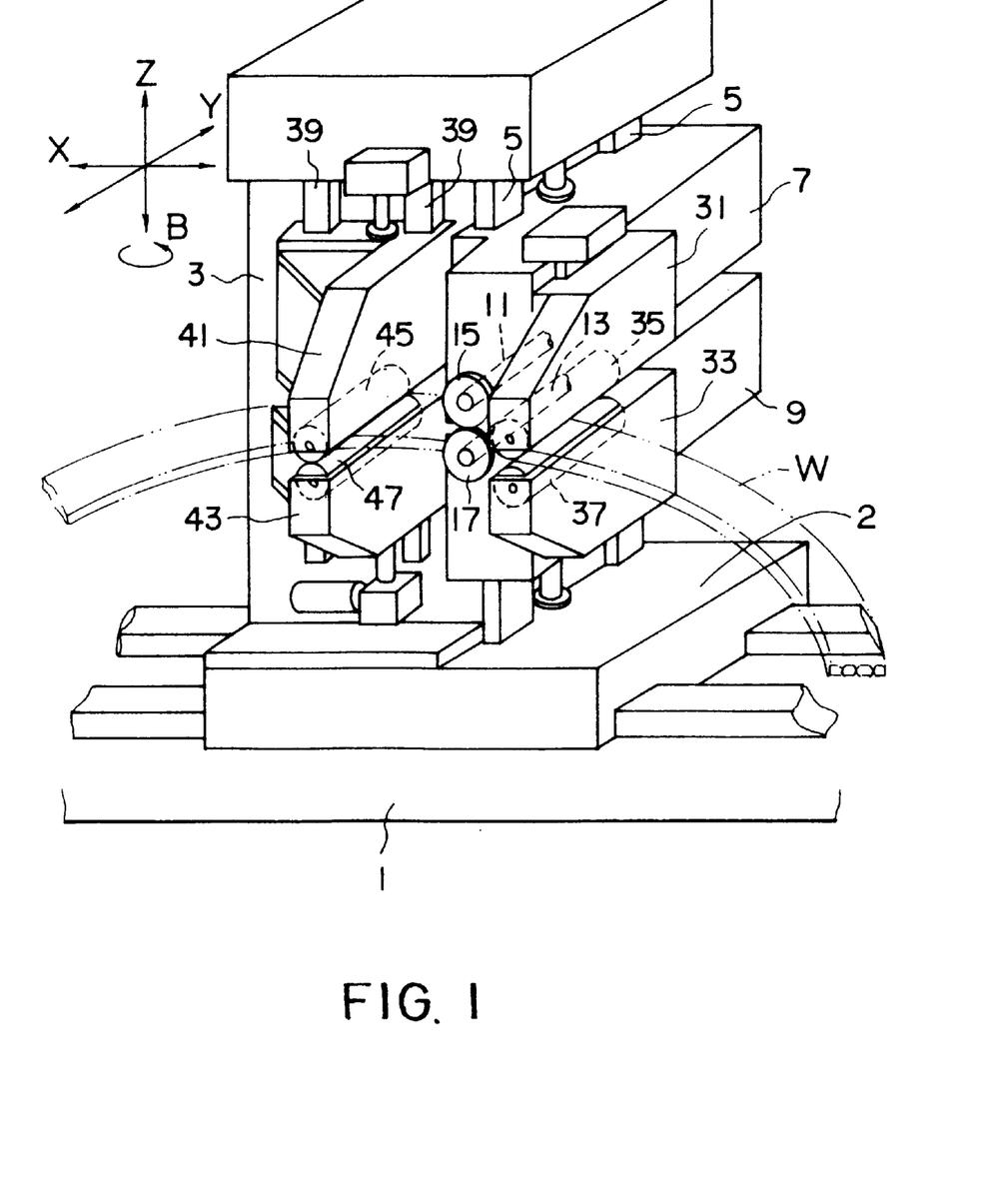
FIG. 1 is a perspective view showing one embodiment of a double-surface machining system according to the present invention.

A first embodiment of the present invention is described hereunder with reference to FIGS. 1 to 5, and as shown in FIG. 1, the double-surface (both-side) machining system generally comprises a base 1, a slider 2 movable on the base 1 in an X-axis direction (bilaterally horizontal direction) and a column 3 vertically set on the slider 2.

A linear guide 5 is vertically formed at one side (right side as viewed) of the column 3, and an upper spindle head 7 and a lower spindle head 9 are set to the linear guide 5 to be vertically movable independently. The upper spindle head 7 and the lower spindle head 9 are driven vertically by independent Z-axis feed mechanisms, not shown, respectively. The Z-axis feed mechanisms are provided each for the upper spindle head 7 and the lower spindle head 9, which can use a general Z-axis feed mechanism comprising a feed screw mechanism and a Z-axis servomotor for rotating the feed screw mechanism.

The upper spindle head 7 supports an upper spindle 11 extending in a Y-axis direction so as to be rotatable about a horizontal axis and the lower spindle head 9 supports a lower spindle 13 extending in a Y-axis direction so as to be rotatable about a horizontal axis.

Tools, such as side cutters 15 and 17, are detachably mounted to the front ends of the upper spindle 11 and the lower spindle 13, respectively, and the side cutters 15 and 17 are disposed so as to vertically face each other at both the sides of the pass (feed) line of a workpiece W.

Figure 5:
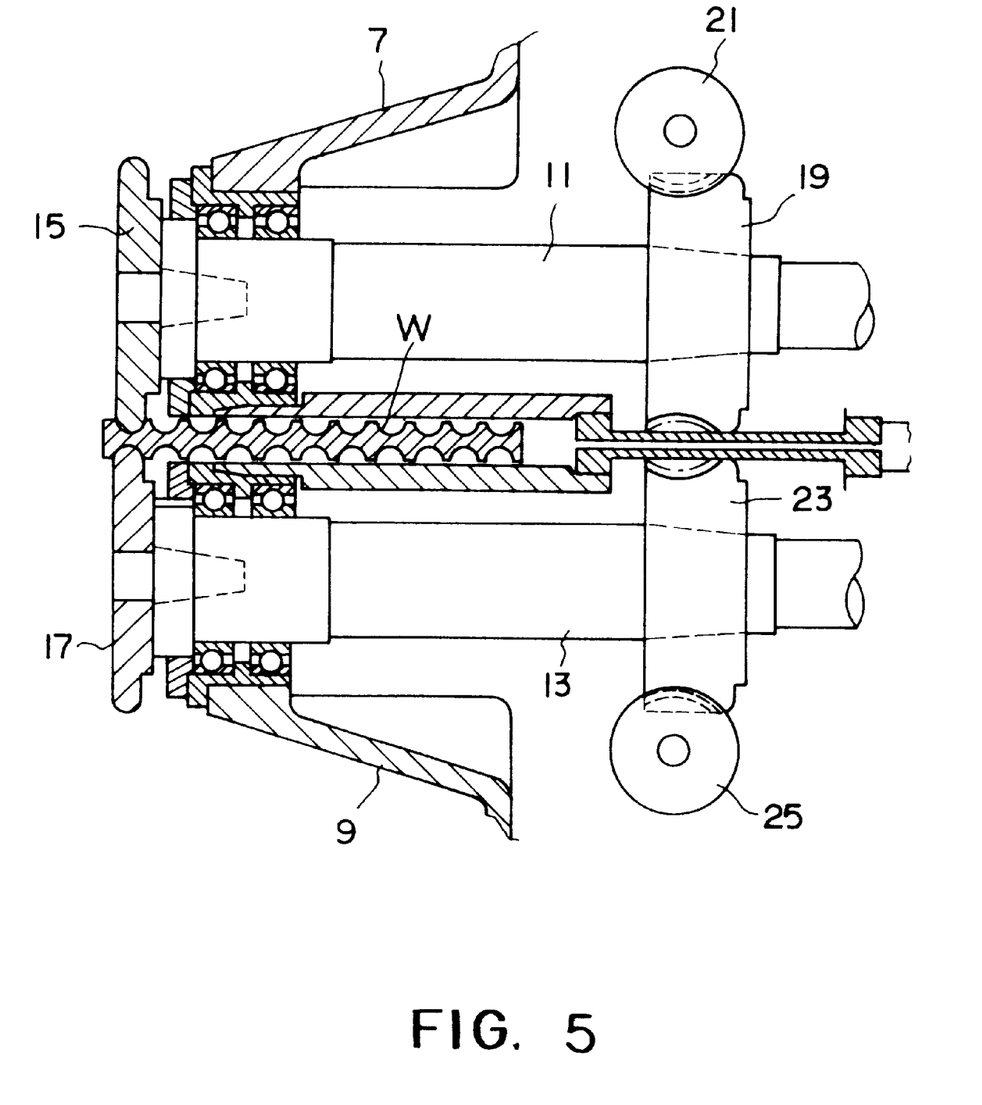
FIG. 5 is a longitudinal sectional view of a spindle head portion of the double-surface machining system of FIG. 1.

The upper spindle 11 and the lower spindle 13 are connected with upper and lower spindle drive motors through bevel gears 19, 21, 23 and 25 in the upper spindle head 7 and the lower spindle head 9 and independently rotated by the upper and lower spindle drive motors.

Figure 2:
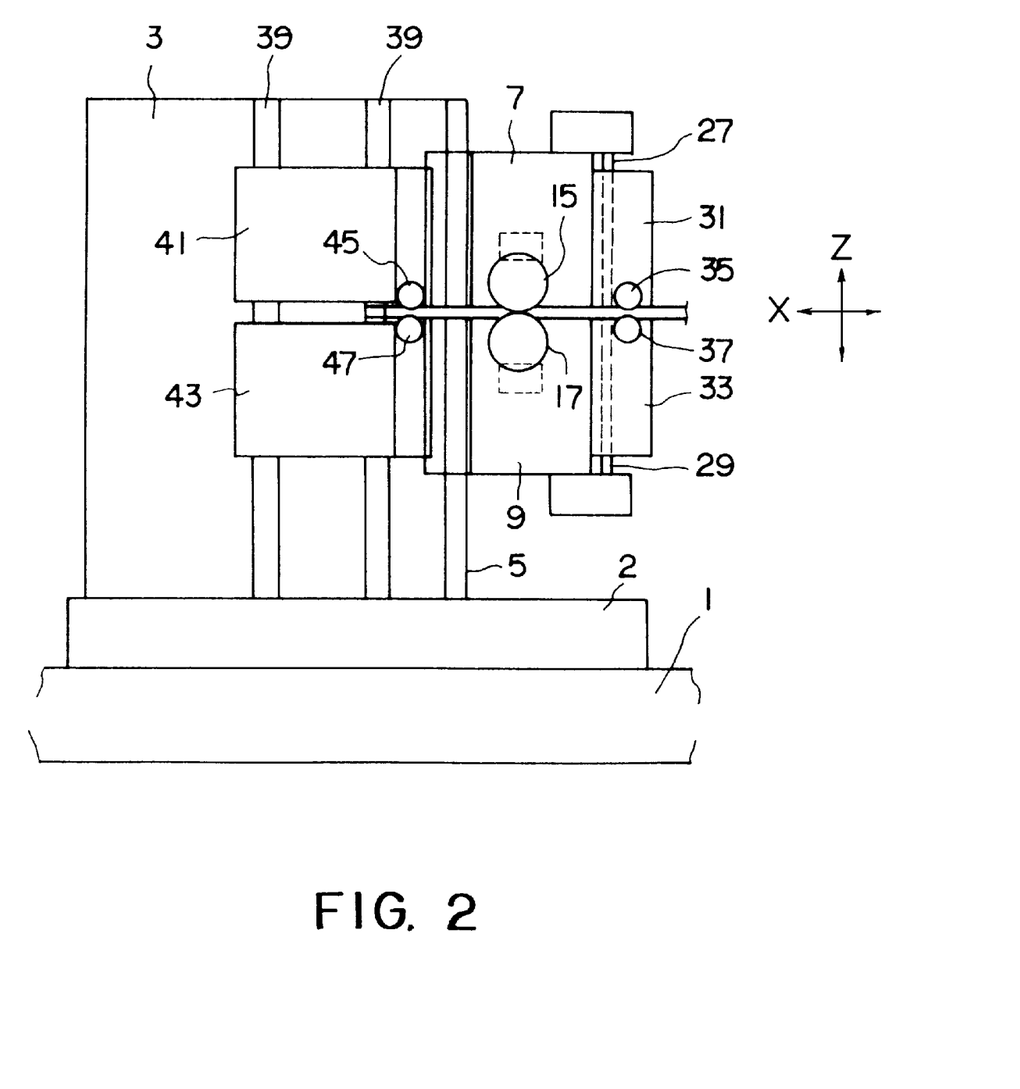
FIG. 2 is a front view of the double-surface machining system of FIG. 1.
Figure 3:
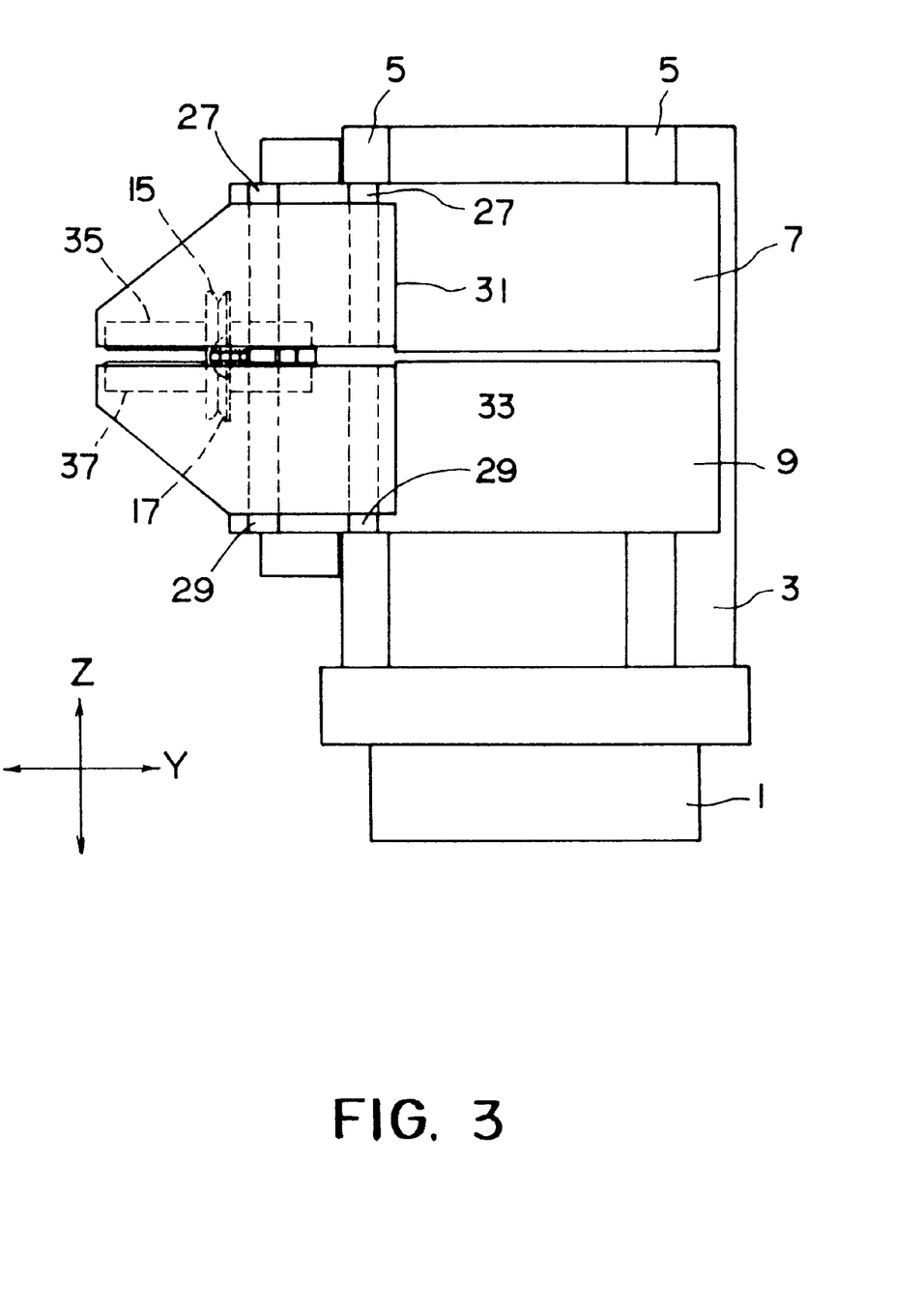
FIG. 3 is a side view of the double-surface machining system of FIG. 1.

As shown in FIGS. 2 and 3, an upper linear guide 27 and a lower linear guide 29 are vertically arranged at one side, right side as viewed in FIG. 2 of the upper spindle head 7 and the lower spindle head 9, respectively. A right upper workpiece support 31 and a right lower workpiece support 33 are vertically movably set to the upper linear guide 27 and the lower linear guide 29, respectively. The right upper workpiece support 31 and the right lower workpiece support 33 are driven by the respective Z-axis feed mechanisms to position the same. The feed mechanism is provided for the right upper workpiece support 31 and the right lower workpiece support 33. A general feed mechanism comprising a feed screw mechanism and a servomotor for rotating the feed screw mechanism can be used as each of the feed mechanisms.

The right upper workpiece support 31 and the right lower workpiece support 33 rotatably support broad pinch rollers 35 and 37, respectively, so that the rollers 35 and 37 can rotate about axes parallel to the rotation center axes of the upper spindle 11 and the lower spindle 13. The pinch rollers 35 and 37 are disposed vertically so as to face each other at both sides of the pass line of the workpiece W and horizontally extend up to the front and rear portions, in the Y-axis direction, of the cutting positions by the side cutters 15 and 17. The lower pinch roller 37 is rotatably set to the right lower workpiece support 33 at an immovable position but the upper pinch roller 35 is elastically supported in a floatable manner by a spring or the like, not shown, for downward pressing the bearing of the pinch roller 5 from the right upper workpiece support 31.

A linear guide 39 is vertically arranged in front of the column 3 and a left upper workpiece support 41 and a left lower workpiece support 43 are set to the linear guide 39 so that each of the supports 41 and 43 is vertically movable. The left upper workpiece support 41 and left lower workpiece support 43 are driven by Z-axis feed mechanisms, not shown, respectively. The feed mechanism is provided for these supports 41 and 43, respectively, and a general feed mechanism comprising a feed screw mechanism and a servomotor for rotating the feed screw mechanism as such feed mechanism.

The left upper workpiece support 41 and left lower workpiece support 43 support broad pinch rollers 45 and 47, respectively, so that the rollers 45 and 47 can rotate about axes parallel with the rotation center axes of the upper spindle 11 and the lower spindle 13. The pinch rollers 45 and 47 are vertically arranged so as to face each other at both the sides of the pass line of the workpiece W and horizontally extend up to the front and rear portions, in the Y-axis direction, of the cutting positions by the side cutters 15 and 17. The lower pinch roller 47 is rotatably set to the left lower workpiece support 43 at an immovable position, but the upper pinch roller 45 is elastically supported in a floatable manner by a spring or the like, not shown, for downward pressing the bearing of the pinch roller 45 from the left upper workpiece support 41.

Figure 4:
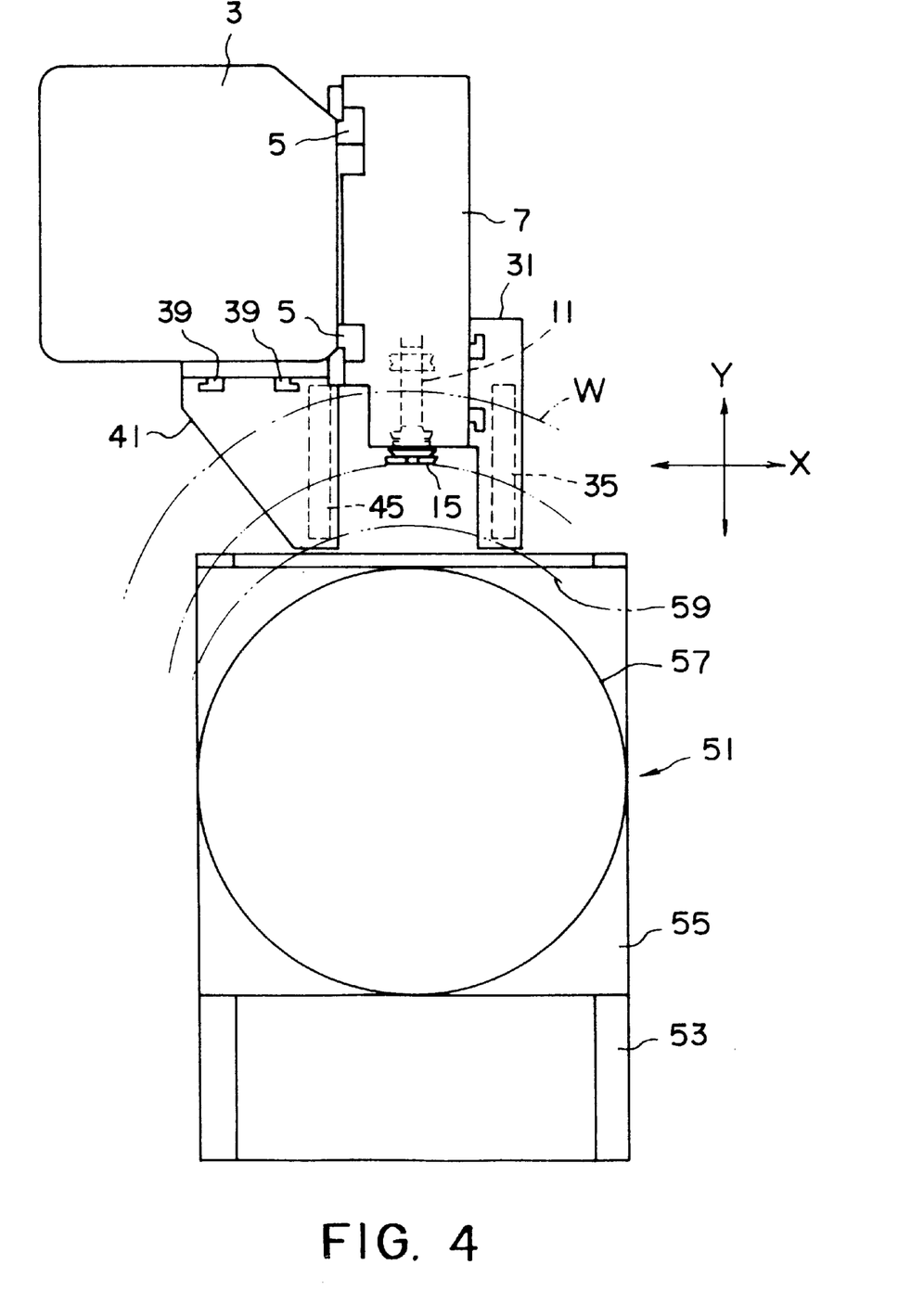
FIG. 4 is a plan view of the double-surface machining system of FIG. 1.

A workpiece table unit 51 is set in front of the base 1 as shown in FIG. 4. The workpiece table unit 51 includes a sliding table 55 capable of moving on a base 53 in the horizontal direction perpendicular to the moving direction of the column 3, that is, in the Y-axis direction, and a rotary table 57 set on the sliding table 55 to be rotatable about a vertical axis. The workpiece table unit 51 horizontally supports an annular workpiece (plate to be machined) W on the rotary table 57 in a predetermined height level by a setting jig 59.

Further, although not illustrated, the sliding table 55 is positioned and rotated by a Y-axis feed mechanism comprising a feed screw mechanism and a Y-axis servomotor for rotating the feed screw mechanism. The rotary table 57 is positioned and rotated by a Z-axis servomotor.

The simultaneous double-surface (both-side) grooving working to the workpiece W for by using the double-surface machining system of the structure described above will be explained hereunder.

First, the workpiece W is mounted to the rotary table 57 by the setting jig 59. Under the above setting state, the workpiece W protrudes entirely outward from the rotary table 57 and is almost horizontally held at a predetermined height level corresponding to the height of the pass line of the workpiece so as to take a position ready for access to the front and back surfaces of the workpiece. When the workpiece is set up, the upper spindle head 7, the right upper workpiece support 31 and the left upper workpiece support 41 are moved to the uppermost positions thereof. Further, the lower spindle head 9, the right lower workpiece support 33, and the left lower workpiece support 43 are moved to the lowermost positions thereof.

Then, the right lower workpiece support 33 and the left lower workpiece support 43 are raised, from the lowermost positions, to positions in predetermined height level, that is, up to height positions where the pinch rollers 37 and 47 contact the lower surface of the workpiece W. The right upper workpiece support 31 and the left upper workpiece support 41 are lowered, from the uppermost positions, to positions in predetermined height levels, that is, to height positions where the pinch rollers 35 and 45 are pressed against the upper surface of the workpiece W with a predetermined pressure. In this case, springs, not shown, provided for the bearings of the pinch rollers 35 and 45 deflect, and the workpiece W is held in the clamped state by the upper and lower pinch rollers 35 and 45 and pinch rollers 37 and 47 in the workpiece pass-line height level while the workpiece W is elastically pinched by the pressure of the springs.

Therefore, the workpiece W is held by the upper and lower pinch rollers 35 and 45 and pinch rollers 37 and 47 in the vertical direction at the right and left sides of the machining positions of the side cutters 15 and 17. Thus, according to such auxiliary supporting, the workpiece W can keep a flatness at the machining position even if the workpiece has no sufficient self-standing stiffness.

When the auxiliary supporting of the workpiece W has been completed, the upper spindle 11 and the lower spindle 13 are rotated, the upper spindle head 7 is lowered in accordance with a cutting value, i.e. grooving depth, and the lower spindle head 9 is raised to start simultaneous grooving working to the front and back surfaces of the workpiece W by means of the side cutters 15 and 17.

Under the above state, the double-surface grooving working can be achieved simultaneously so as to from groove having, for example, D-shape through the compound movement of the X-axis movement of the column 3, the Y-axis movement of the sliding table 55 and the rotation of the rotary table 57 under the simultaneous multiple-axis control by rotating the rotary table 57, moving the sliding table 55 in the Y-axis direction and moving the column 3 in the X-axis direction.

Accordingly, even in a case where a workpiece W has no sufficient self-standing stiffness, the front and back surfaces (both sides) of the workpiece can be simultaneously and efficiently grooved with a high accuracy by the side cutters 15 and 17 while ensuring the flatness thereof during the grooving working.

When the workpiece W is fed according to the rotation of the rotary table 57, the Y-axis movement of the sliding table 55 and the X-axis movement of the column 3, the pinch rollers 35, 37, 45, and 47 rotate about their central axes. Therefore, the feed load of the workpiece W is not increased or the workpiece W is not damaged because the workpiece W is held by the pinch rollers 35, 37, 45, and 47. Moreover, because the workpiece W is held while being elastically pinched, the clamping, i.e. holding pressure to the workpiece W becomes not excessive and the moving load of the workpiece W is not excessively increased even if the plate thickness or flatness of the workpiece W is not constant.

Figure 6:
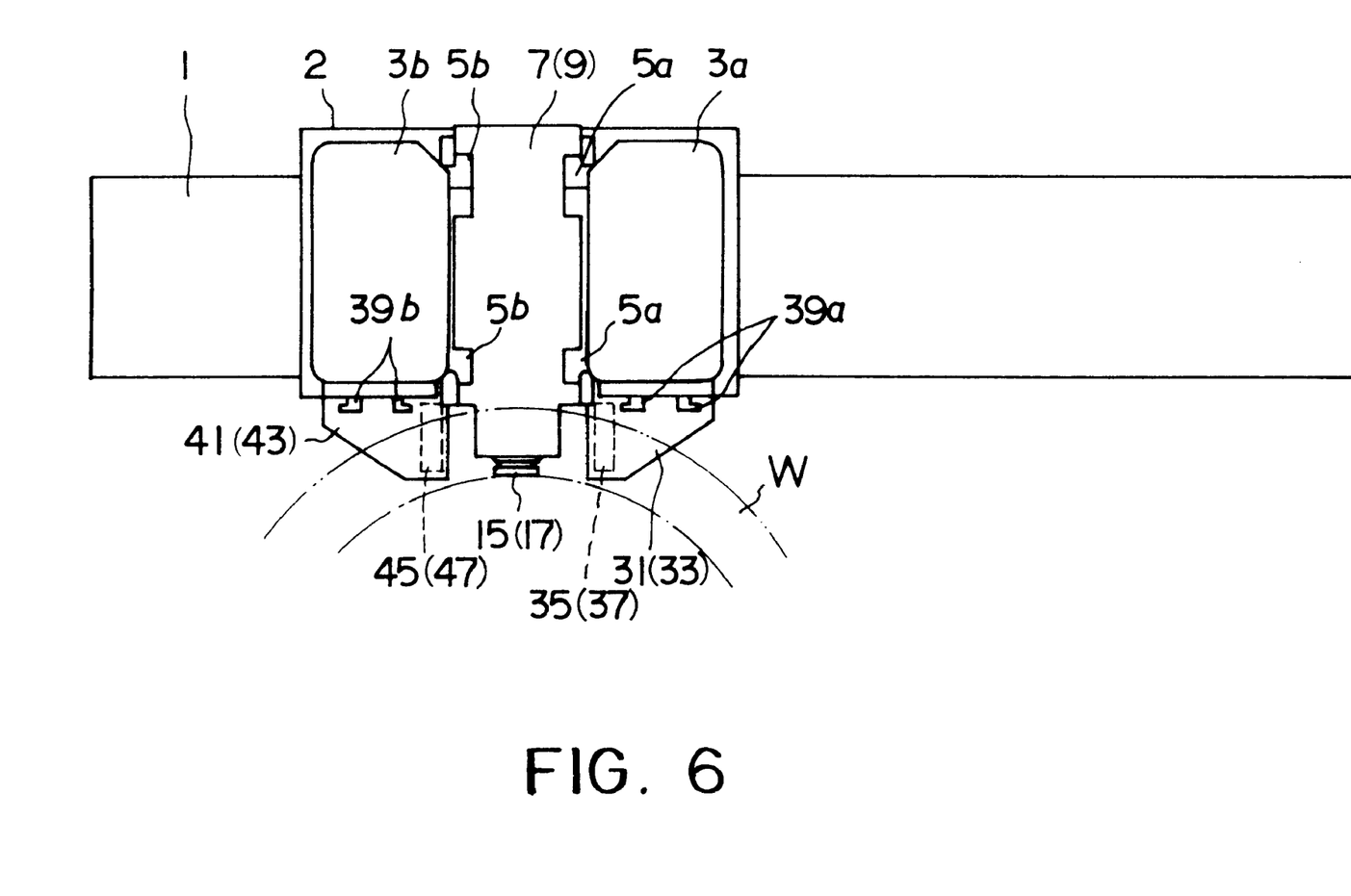
FIG. 6 is a plan view showing another embodiment of a double-surface machining system according to the present invention.

FIG. 6 represents another embodiment of the double-surface (both-side) machining system of the present invention. In this embodiment, right and left columns 3a and 3b are mounted on the slider 2 in a parallel arrangement. The upper spindle head 7 and the lower spindle head 9 are arranged between the columns 3a and 3b so as to be engaged with linear guides 5a and 5b respectively provided for the columns 3a and 3b and supported by the columns 3a and 3b so as to be vertically movable.

The right upper workpiece support 31 and the right lower workpiece support 33 are engaged with a linear guide 39a formed to the column 3a and supported by the column 3a so as to be vertically movable. The left upper workpiece support 41 and the left lower workpiece support 43 are engaged with a linear guide 39b formed to the column 3b and supported by the column 3b so as to be vertically movable.

According to the structure of this embodiment, since the upper spindle head 7 and the lower spindle head 9 are supported by the two right and left columns 3a and 3b to be vertically movable, the supporting stiffness of the upper spindle head 7 and that of the lower spindle head 9 can be improved.

Figure 7:
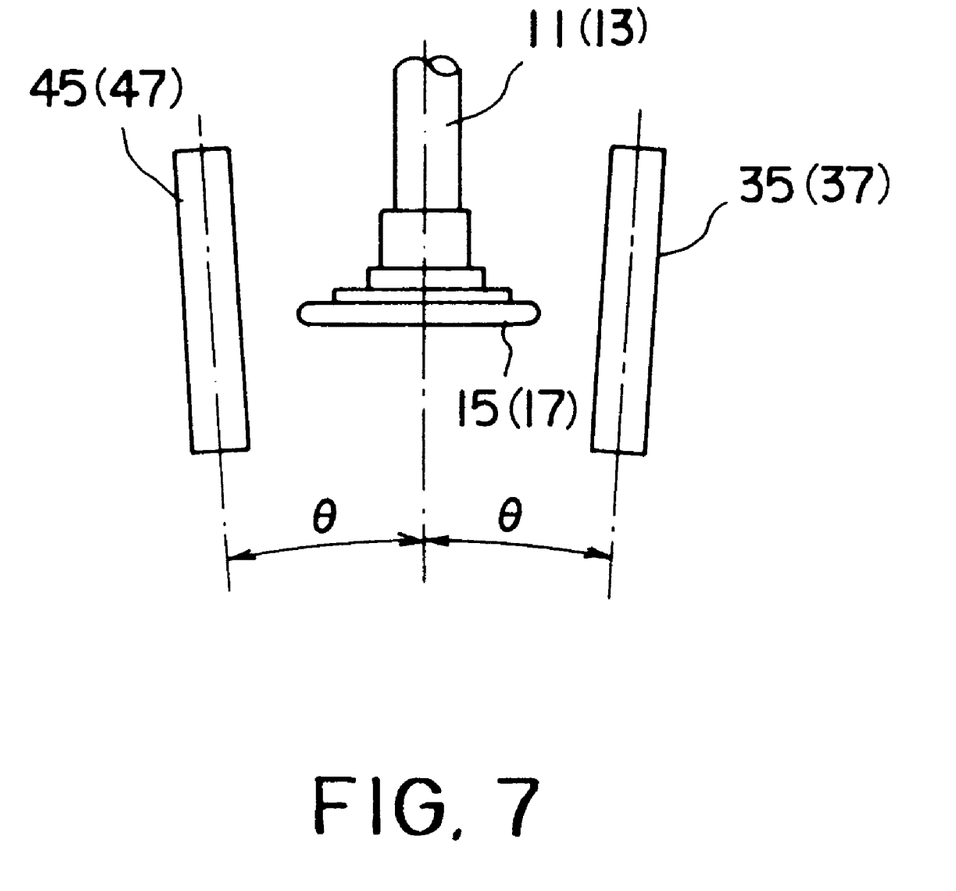
FIG. 7 is a schematic plan view showing a modification of a pinch-roller arrangement of the double-surface machining system of the present invention.

Furthermore, according to this embodiment, the pinch rollers 35, 37, 45, and 47 are rotatable about axes parallel to the rotary axes of the upper and lower spindles 11 and 13. As shown in FIG. 7, however, it is also permitted that the pinch rollers 35, 37, 45, and 47 are rotatable about axes having a relatively small angle θ in a plane horizontal with respect to the rotary axes of the upper and lower spindles 11 and 13.

Moreover, it may be permitted to adopt a structure in which the floating support of the pinch rollers 35, 37, 45, and 47 is applied to the lower ones or both the upper and lower ones.

It is to be noted that the present invention is not limited to the described embodiments and many other modifications and changes may be made without departing from the scope of the appended claims.

What is claimed is:

1. A double surface machining system for machining both side surfaces of a workpiece in an operational state, comprising:

a pair of upper and lower spindle heads to be vertically positioned and driven, respectively;

a pair of upper and lower spindles provided for said upper and lower spindle heads, respectively, in parallel to each other, to be rotatable about horizontal axes thereof, said upper and lower spindles having front ends to which tools are mounted, respectively;

a first pair of upper and lower workpiece supports for supporting the workpiece therebetween, which are vertically positioned and driven on a first side of the upper and lower spindle heads as viewed from a workpiece feed direction, respectively;

a second pair of upper and lower workpiece supports for supporting the workpiece therebetween, which are vertically positioned and driven on a second side of the upper and lower spindle heads as viewed from the workpiece feed direction, respectively;

a slider movable in a horizontal direction;

a column means vertically mounted on said slider; and a worktable device for holding the workpiece at a predetermined level, said worktable device including a slide table to be slidable in a horizontal direction normal to a moving direction of the column means and a rotary table rotatable about a vertical axis thereof;

wherein both side surfaces of the workpiece are subjected to machining simultaneously by the tools mounted to the respective spindles while being supported by the two paired workpiece supports on both the sides of the spindle heads, and said upper and lower spindle heads and said upper and lower workpiece supports are operatively mounted to said column means to be horizontally movable on the slider;

wherein said column means comprises first and second columns vertically disposed side by side on said slider, said upper and lower spindle heads are arranged between the two columns and supported thereby to be vertically movable, said first pair of upper and lower workpiece supports are supported by said first column to be vertically movable and said second pair of upper and lower workpiece supports are supported by said second column to be vertically movable.

2. A double-surface machining system according to claim 1, wherein said first and second pairs of upper and lower workpiece supports are provided with first and second pairs of upper and lower pinch rollers to be rotatable, respectively, for supporting the workpiece therebetween.

3. A double-surface machining system according to claim 2, wherein said pinch rollers are rotatable about axes parallel to central rotational axes of said upper and lower spindle heads.

4. A double-surface machining system according to claim 2, wherein said pinch rollers are rotatable about axes having certain angles in a horizontal plane.

5. A double-surface machining system according to claim 2, wherein either one of upper and lower pinch rollers are supported in a floatable manner so as to be elastically support the workpiece.

6. A double-surface machining system according to claim 1, wherein said first and second pair of upper and lower workpiece supports are independently positioned and driven in vertical directions thereof with respect to the upper and lower spindle heads.

* * * * *